United States Patent
Müller

(10) Patent No.: US 7,726,623 B2
(45) Date of Patent: Jun. 1, 2010

(54) FASTENING DEVICE FOR AN INTERNAL REAR VIEW MIRROR OF MOTOR VEHICLES ON AN INNER SIDE OF A WINDSHIELD

(75) Inventor: Marcus Müller, Pforzheim (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 0 days.

(21) Appl. No.: 12/143,357

(22) Filed: Jun. 20, 2008

(65) Prior Publication Data

US 2008/0315060 A1 Dec. 25, 2008

(30) Foreign Application Priority Data

Jun. 20, 2007 (DE) .................. 10 2007 028 162

(51) Int. Cl.
*A47G 1/16* (2006.01)
(52) U.S. Cl. .................................. 248/475.1
(58) Field of Classification Search ............. 248/475.1, 248/477, 478, 466, 467; 359/871, 872
See application file for complete search history.

(56) References Cited

U.S. PATENT DOCUMENTS

| | | | | |
|---|---|---|---|---|
| 3,928,894 | A * | 12/1975 | Bury et al. .................. 248/467 |
| 4,125,244 | A * | 11/1978 | Lukey ..................... 248/475.1 |
| 5,058,851 | A | 10/1991 | Lawlor et al. |
| 5,377,948 | A | 1/1995 | Suman et al. |
| 5,820,097 | A * | 10/1998 | Spooner ..................... 248/549 |
| 6,447,127 | B1 | 9/2002 | Yoshida et al. |
| 2004/0079853 | A1 * | 4/2004 | Suzuki et al. ............... 248/476 |
| 2006/0119960 | A1 * | 6/2006 | Yoshida ..................... 359/871 |
| 2007/0228247 | A1 * | 10/2007 | Tanaka et al. ............... 248/476 |

FOREIGN PATENT DOCUMENTS

| | | |
|---|---|---|
| DE | 2 015 608 | 10/1970 |
| DE | 4011995 C2 | 10/1990 |
| DE | 69309828 T2 | 12/1997 |
| GB | 1 291 638 | 10/1972 |
| WO | 9316900 A1 | 9/1993 |

OTHER PUBLICATIONS

German Search Report dated May 8, 2008.
European Search Report dated Dec. 21, 2009.

* cited by examiner

*Primary Examiner*—Ramon O Ramirez

(57) ABSTRACT

A fastening device for an internal rear view mirror of motor vehicles to be installed on an inner side of a windshield contains a holding part which is held in position on the windshield by adhesive bonding, to which holding part is detachably fastened a mirror foot of the internal rear view mirror. In order to obtain a statically precisely defined, highly rigid connection between the holding part and mirror foot, it is provided that the mirror foot, in its mounted operating position, is supported directly on the holding part merely by a six-point support and is fastened to the holding part by a separate retaining device.

14 Claims, 4 Drawing Sheets

FASTENING DEVICE FOR AN INTERNAL REAR VIEW MIRROR OF MOTOR VEHICLES ON AN INNER SIDE OF A WINDSHIELD

CROSS-REFERENCE TO RELATED APPLICATION

This application claims the priority, under 35 U.S.C. §119, of German application DE 10 2007 028 162.7, filed Jun. 20, 2007; the prior application is herewith incorporated by reference in its entirety.

BACKGROUND OF THE INVENTION

Field of the Invention

The invention relates to a fastening device for an internal rear view mirror of motor vehicles to be attached to an inner side of a windshield. The fastening device has a holding part which is held in position by adhesive bonding being provided on the windshield, to which holding part is detachably fastened a mirror foot of the internal rear view mirror.

Published, non-prosecuted German patent application DE 20 15 608 A discloses a fastening device for an internal rear view mirror of motor vehicles, with a plastic plate-shaped holding part with a rectangular outline being fastened to the inner side of a windshield by adhesive bonding. Undercut V-shaped holding grooves are provided at two spaced-apart side edges, which are aligned parallel to one another, of the holding part, into which holding grooves correspondingly formed plug-in edges of the mirror foot can be inserted.

In order to ensure the sliding of the mirror foot onto the holding part and in order to compensate tolerances between the two components, the side edges of the V-shaped holding grooves are kept relatively thin so that they can elastically deflect during the assembly of the mirror foot.

On account of the elastic formation of the holding part in regions, the fastening device has a relatively low rigidity in the holding part/mirror foot connecting region, as a result of which, in dynamic driving operation of the vehicle, disturbing mirror glass vibrations can occur. In addition, the fastening device is statically overdetermined.

SUMMARY OF THE INVENTION

It is accordingly an object of the invention to provide a fastening device for an internal rear view mirror of motor vehicles to be attached to an inner side of a windshield that overcomes the above-mentioned disadvantages of the prior art devices of this general type, in which the connection between the holding part and mirror foot is statically precisely defined and has a high rigidity, so that the mirror glass vibration behavior in driving operation is considerably improved.

With the foregoing and other objects in view there is provided, in accordance with the invention, a fastening device for an internal rear view mirror of motor vehicles to be installed on an inner side of a windshield. The fastening device contains a six-point support, a separate retaining device, and a holding part held in position by adhesive bonding provided on the windshield, to the holding part is detachably fastened a mirror foot of the internal rear view mirror. The mirror foot, in a mounted operating position, is supported directly on the holding part merely by the six-point support and is fastened to the holding part by the separate retaining device.

The advantages primarily achieved by the invention are to be considered those of a statically precisely defined, highly rigid connection being created by the six-point support between the holding part and mirror foot, by which connection low mirror glass vibrations are ensured in dynamic driving operation. Simple and fast mounting of the internal rear view mirror on the holding part is created by a bayonet-like retaining device. On account of the self-centering connection, no incorrect assembly of the mirror foot is possible. As a result of the freedom from play of the connection, the mirror foot cannot rotate during adjustment of the mirror head.

In accordance with an added feature of the invention, the six-point support has in each case three support elements disposed offset with respect to one another, which are of a projecting configuration, and are provided on each of the holding part and on the mirror foot. The support elements of one of the holding part and the mirror foot have in each case projecting prismatic guides. The support elements of the other one of the holding part and the mirror foot have correspondingly configured holding grooves being recessed, the projecting prismatic guides interact in a form-fitting manner with the correspondingly configured holding grooves. The projecting prismatic guides have a shape of a triangular prism. The projecting prismatic guides are provided on the support elements of the mirror foot. The correspondingly configured holding grooves are formed in the support elements of the holding part. The projecting prismatic guides each have two projecting side faces running at an angle with respect to one another, with the angle being between 60° and 120°. Ideally, the three support elements of the holding part and of the mirror foot run in each case at an angle of 120° with respect to one another.

In accordance with an additional feature of the invention, the holding part has a collar being annular in regions, and the support elements of the holding part are integrally formed on that side of the collar facing away from the windshield.

In accordance with another feature of the invention, the support elements of the mirror foot are formed on that end side of the mirror foot which faces toward the holding part.

In accordance with a further feature of the invention, insertion bevels are provided in each case on the support elements of the holding part and of the mirror foot in front of the projecting prismatic guides and the correspondingly configured holding grooves.

In accordance with another further feature of the invention, the holding part has radially disposed latching grooves, and the separate retaining device has a retaining element connected to the mirror foot. The retaining element has at least two resilient retaining tongues bent in a direction of the holding part and which, when the mirror foot is mounted, engage into the radially disposed latching grooves of the holding part.

In accordance with another added feature of the invention, the retaining element has an annular base section supported on and connected to an end side of the mirror foot. The retaining element has three profiled retaining tongues disposed in a stellate fashion with respect to one another.

In accordance with another further feature of the invention, the radially disposed latching grooves are provided locally on an outer side of the collar of the holding part.

In accordance with a concomitant feature of the invention, the holding part has free cut-out regions formed therein disposed in front of the radially disposed latching grooves.

Other features which are considered as characteristic for the invention are set forth in the appended claims.

Although the invention is illustrated and described herein as embodied in a fastening device for an internal rear view mirror of motor vehicles on an inner side of a windshield, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
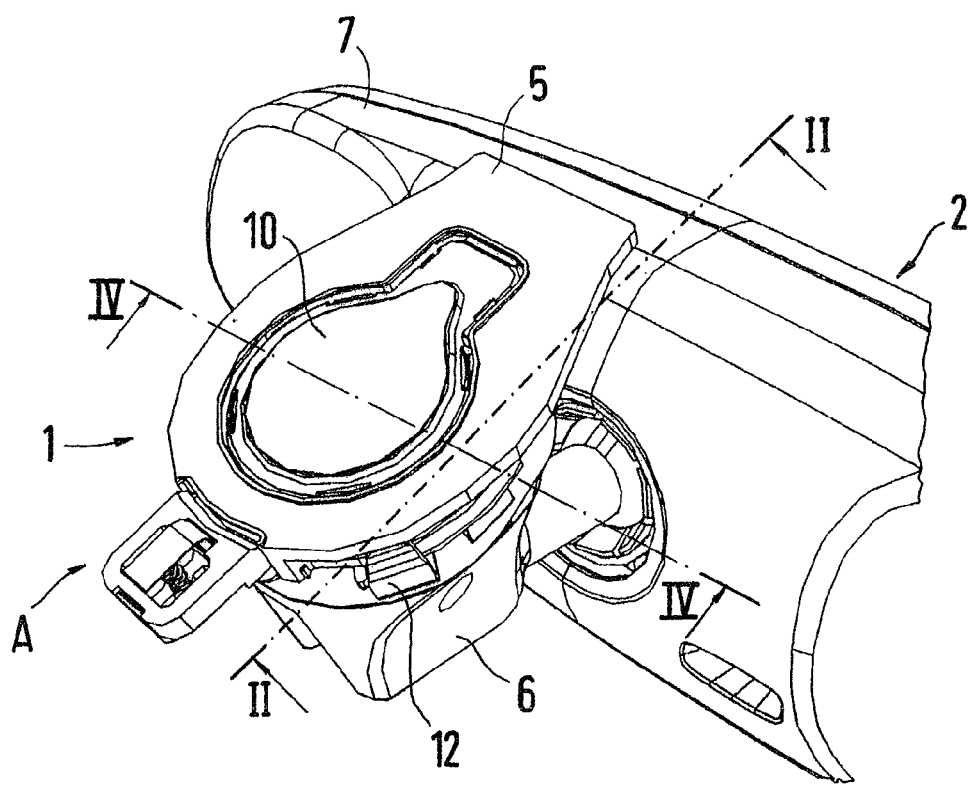
FIG. 1 is a diagrammatic, perspective oblique view of an internal rear view mirror of a motor vehicle from the rear and above according to the invention.
Figure 2:
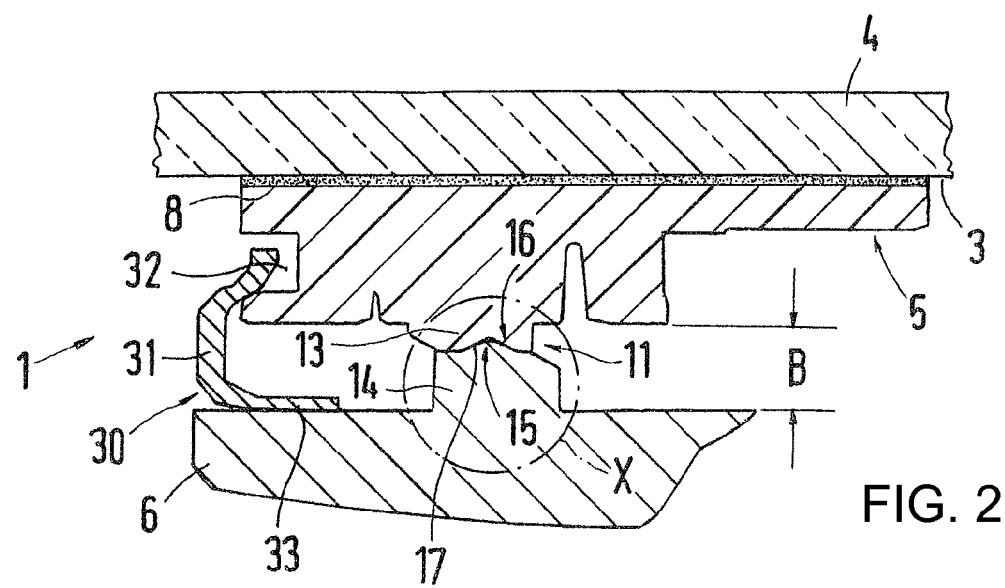
FIG. 2 is a sectional view taken along the line II-II shown in FIG. 1 in an enlarged illustration and rotated.

Referring now to the figures of the drawing in detail and first, particularly, to FIGS. 1 and 2 thereof, there is shown a fastening device 1 for an internal rear view mirror 2 of motor vehicles, with the internal rear view mirror 2 being fastened to the inner side 3 of a windshield 4 with the interposition of a holding part 5. The internal rear view mirror 2 is composed of a mirror foot 6 and a mirror head 7 which is articulatedly connected thereto. The holding part 5, which has a low installation height, is fastened by adhesive bonding to the inner side 3 of the windshield 4 and, in the exemplary embodiment, is produced from a fiber-reinforced plastic. The holding part 5 could however also be produced from a sintered metal.

Figure 3:
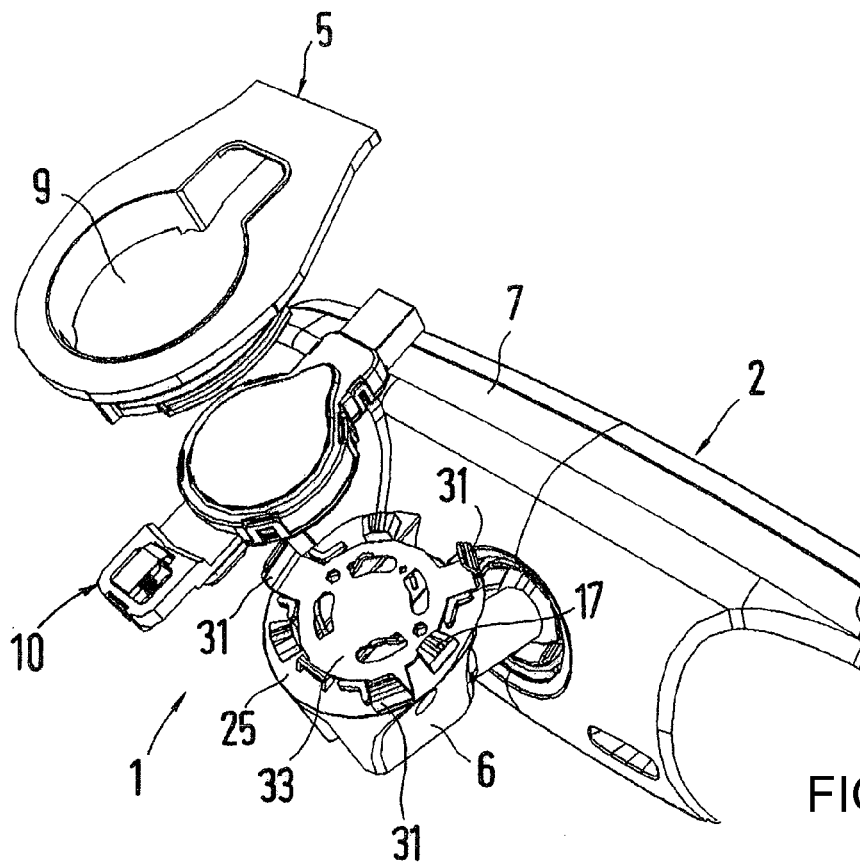
FIG. 3 is an exploded, perspective view of the internal rear view mirror, a sensor element and a holding part.

An upper planar face 8 of the holding part 5 is connected by an adhesive layer or an adhesive foil to the inner side 3 of the windshield 4. The holding part 5 serves for retaining and supporting the internal rear view mirror 2. In the exemplary embodiment, the holding part 5 which is of an annular configuration in regions has a central cutout 9. Inserted into the cutout 9 is a sensor element 10 which, when the internal rear view mirror 2 is mounted, is pressed by a non-illustrated pressing spring with a preload against the inner side 3 of the windshield 4 (see FIGS. 3, 4). The sensor element 10 can contain one or more sensors. In the exemplary embodiment, the sensor element 10 has a rain sensor, a light sensor and a humidity sensor.

The shape of the cutout 9 is matched to the outer contour of the sensor element 10, so that the latter is positioned in the cutout 9 of the holding part 5 so as to be correctly located and immovable.

According to the invention, the mirror foot 6, in its mounted operating position A, is supported directly on the holding part 5 merely by a six-point support 11 and is fastened to the holding part 5 by a separate retaining device 12. In order to form the six-point support 11, in each case three support elements 13, 14 which are disposed offset with respect to one another and which are of a projecting configuration are provided on the holding part 5 and on the mirror foot 6. In each case projecting prismatic guides 15 are formed on the support elements 13, 14 of the mirror foot 6 or of the holding part 5, which prismatic guides 15 interact in a form-fitting manner with correspondingly configured holding grooves 16, which are disposed so as to be recessed, of the in each case other part.

Figure 7:
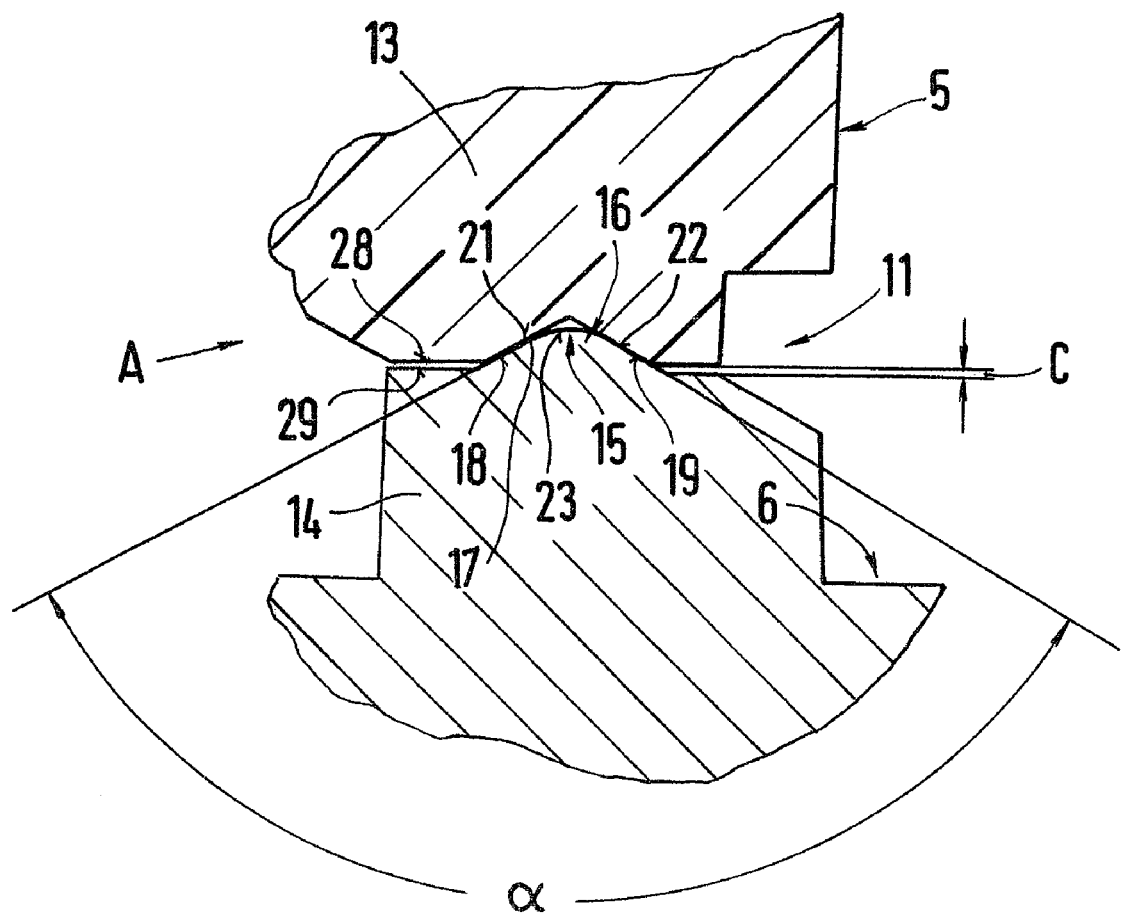
FIG. 7 is an enlarged sectional view of detail X shown in FIG. 2.

In the exemplary embodiment, the prismatic guides 15 have the shape of a triangular prism 17 (see FIG. 7). The two projecting side faces 18, 19 of each triangular prism 17, which side faces 18, 19 extend obliquely downward from a common theoretical corner point 20, form two support faces, which run at an angle α with respect to one another, of the support element 13, 14 of the six-point support 11. The side faces 18, 19 of the prismatic guides 15 run at an angle α with respect to one another, with the angle α being between 60° and 120°. The two side faces 18, 19 are of approximately the same length.

In the exemplary embodiment, the projecting prismatic guides 15 are provided on the support elements 14 of the mirror foot 6, whereas the holding grooves 16 which are disposed so as to be recessed are formed on the support elements 13 of the holding part 5. The arrangement of the prismatic guides 15 and the holding grooves 16 can however also be reversed. The correspondingly formed side faces 21, 22, which are disposed so as to be recessed, of the holding grooves 16 likewise form two support faces, which run obliquely with respect to one another, of a support element 13, 14 of the six-point support 11. The two side faces 18, 19 of the prismatic guides 15 are connected to one another by a radial transition region 23, with the radius of the transition region 23 being greater than the relatively small radius between the two side faces 21, 22 of the holding grooves 16.

In the exemplary embodiment, the mirror foot 6 rests, at each of its three support elements 14, with the obliquely-running side face 18 in regions on the co-aligned side face 21 of the support element 13, whereas the side face 19, which runs at an angle with respect to the side face 18, of the support element 14 is supported on the co-aligned side face 22 of the support element 13 disposed on the holding part 5. Between the three support elements 13, 14 which are disposed in each case in pairs, the holding part 5 runs with an axial spacing (dimension B) with respect to the mirror foot 6.

The three support elements 13, 14 which are formed in each case in one piece with the holding part 5 and with the mirror foot 6 are disposed in a stellate fashion with respect to a theoretical central point and are offset with respect to one another in each case by 90° to 135°, preferably by approximately 120°. The support elements 13 of the holding part 5 are integrally formed on that side of a collar 24, which is of an annular configuration in regions, of the holding part 5 which faces away from the windshield 4. The support parts 14 of the mirror foot 6, which is preferably produced from an aluminum alloy or from plastic, are integrally formed on that end side 25 of the mirror foot 6 which faces toward the holding part 5. Insertion bevels 26, 27 are formed in each case on the support parts 13, 14 of the holding part 5 and of the mirror foot 6 in front of the prismatic guides 15 and the holding grooves 16, with the insertion bevel 26 being assigned to the prismatic guide 15 and the insertion bevel 27 being assigned to the holding groove 16. The end sides 28, 29, which are aligned toward one another, of in each case two corresponding support elements 13, 14 run with a slight axial spacing (dimension C), so that the holding part 5 and the mirror foot 6 rest or are supported locally on one another merely at six obliquely-running bearing faces.

Figure 4:
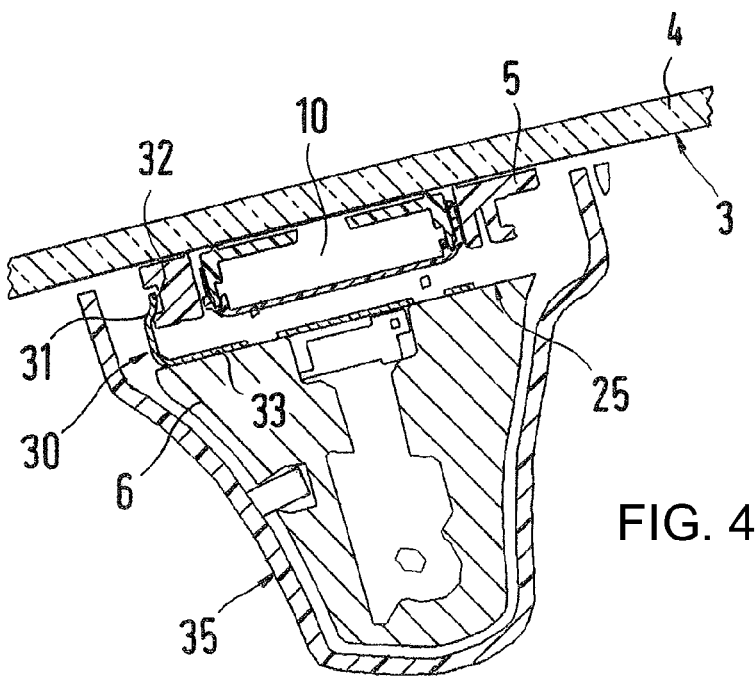
FIG. 4 is a sectional view taken along the line IV-IV shown in FIG. 1.
Figure 5:
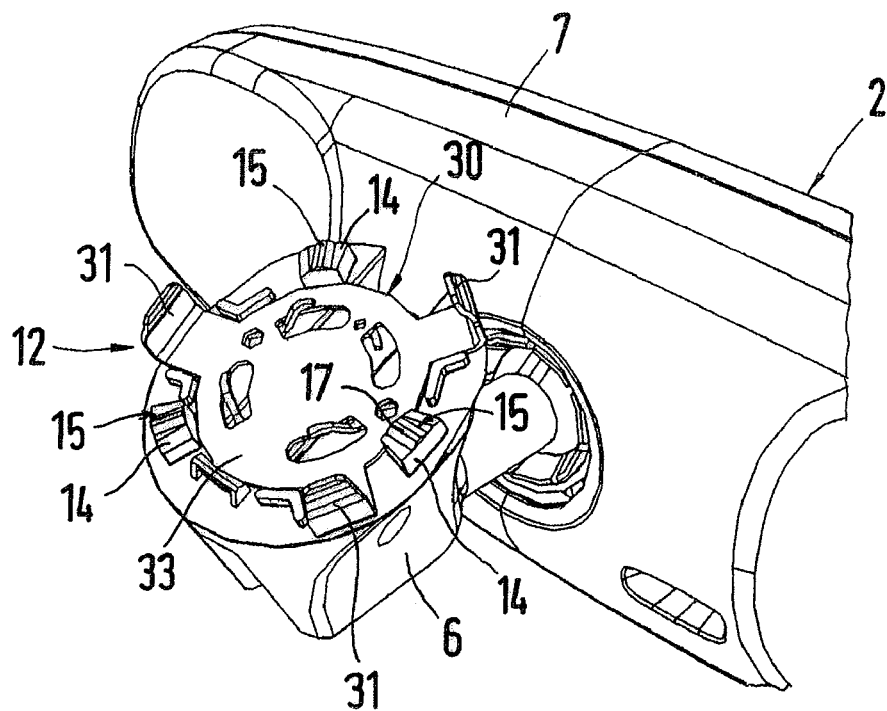
FIG. 5 is a perspective oblique view similar to FIG. 1, with the mirror foot and the retaining element which is fastened to the mirror foot being illustrated.
Figure 6:
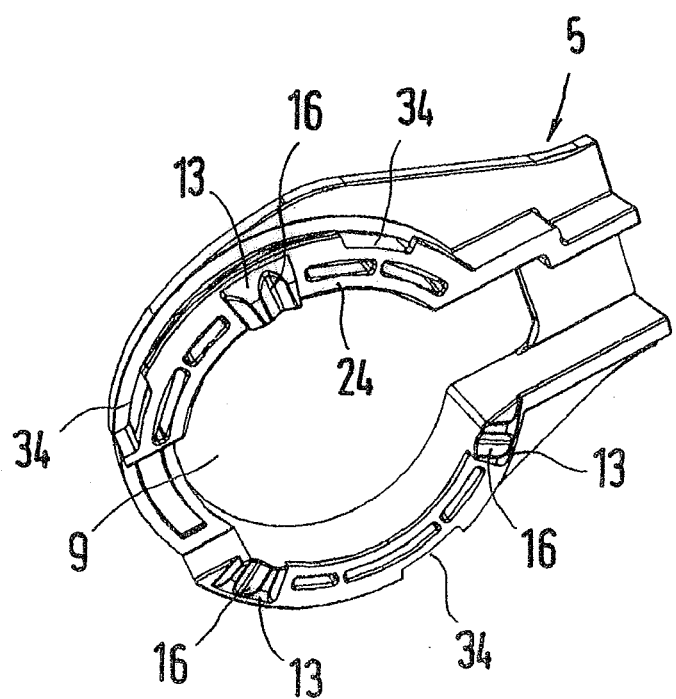
FIG. 6 is a perspective view from below of the holding part which is fastened to the windshield.

The retaining device 12 for the mirror foot 6 contains a retaining element 30 which is connected to the mirror foot 6, which retaining element 30 has at least two resilient retaining tongues 31 which are bent in the direction of the holding part 5 and which, when the mirror foot 6 is mounted, engage into radially arranged latching grooves 32 of the holding part 5 so as to engage behind these (see FIG. 4). The retaining element 30, with an annular base section 33, rests on and is connected to the substantially planar end side 25 of the mirror foot 6. In the exemplary embodiment, the base section 33 is connected by two spaced-apart screw fastenings (not illustrated in any more detail) to the mirror foot 6. According to FIG. 5, the retaining element 30 has resilient retaining tongues 31 which are arranged in a stellate fashion with respect to one another. Latching grooves 32 are provided locally on the outer side of the annular collar 24 of the holding part 5. In each case free cut-out regions 34 are provided on the holding part 5 in front of the latching grooves 32, in order that the retaining tongues 31 of the mirror foot 6 can be placed into a pre-latched position. The mirror foot 6 is fixed to the holding part 5 by a subsequent rotation of the mirror foot 6 relative to the holding part 5 by an angle of approximately 10° to 20° clockwise. The fixing of the mirror foot 6 takes place in principle in the same way as the bayonet connection for an objective lens. The mirror foot 6, the holding part 5 and the retaining element 30 are for the most part encased by a multi-part cover 35 which is fastened to the mirror foot 6 (for example by being plugged on or clipped on) after the mounting of the internal rear view mirror 2 (see FIG. 4).

The invention claimed is:

1. A fastening device for an internal rear view mirror of a motor vehicle, to be installed on an inner side of a windshield, the fastening device comprising:
    a mirror foot for supporting the internal rear view mirror, the mirror foot including a first number of support points;
    a holding part including a second number of support points;
    the first number of support points and the second number of support points forming a six-point support;
    a separate retaining device;
    the holding part held in position by adhesive bonding provided on the windshield, to said holding part is detachably fastened said mirror foot the mirror foot, in a mounted operating position, being supported directly on said holding part merely by said six-point support and being fastened to said holding part by said separate retaining device;
    said holding part having radially disposed latching grooves formed therein; and
    said separate retaining device having a retaining element connected to the mirror foot, said retaining element having at least two resilient retaining tongues bent in a direction of said holding part and which, when the mirror foot is mounted, engage into said radially disposed latching grooves of said holding part.

2. The fastening device according to claim 1, wherein:
    said six-point support has in each case three support elements disposed offset with respect to one another, which are of a projecting configuration, and are provided on each of said holding part and on the mirror foot;
    said support elements of one of said holding part and the mirror foot have in each case projecting prismatic guides; and said support elements of the other one of said holding part and the mirror foot have correspondingly configured holding grooves formed therein and being recessed, said projecting prismatic guides interact in a form-fitting manner with said correspondingly configured holding grooves.

3. The fastening device according to claim 2, wherein said projecting prismatic guides have a shape of a triangular prism.

4. The fastening device according to claim 2, wherein said projecting prismatic guides are provided on said support elements of the mirror foot.

5. The fastening device according to claim 2, wherein said correspondingly configured holding grooves are formed in said support elements of said holding part.

6. The fastening device according to claim 2, wherein said projecting prismatic guides each have two projecting side faces running at an angle with respect to one another, with said angle being between 60° and 120°.

7. The fastening device according to claim 2, wherein said three support elements of said holding part and of the mirror foot run in each case at an angle of 120° with respect to one another.

8. The fastening device according to claim 2, wherein said holding part has a collar being annular in regions, and said support elements of said holding part are integrally formed on that side of said collar facing away from the windshield.

9. The fastening device according to claim 2, wherein said support elements of the mirror foot are formed on that end side of the mirror foot which faces toward said holding part.

10. The fastening device according to claim 2, further comprising insertion bevels in each case on said support elements of said holding part and of the mirror foot in front of said projecting prismatic guides and said correspondingly configured holding grooves.

11. The fastening device according to claim 1, wherein said retaining element has an annular base section supported on and connected to an end side of the mirror foot.

12. The fastening device according to claim 1, wherein said retaining element has three profiled retaining tongues disposed in a stellate fashion with respect to one another.

13. The fastening device according to claim 1, wherein said radially disposed latching grooves are provided locally on an outer side of said collar of said holding part.

14. The fastening device according to claim 13, wherein said holding part has free cut-out regions formed therein disposed in front of said radially disposed latching grooves.

* * * * *